United States Patent [19]

Fligsten et al.

[11] Patent Number: 4,630,324
[45] Date of Patent: Dec. 23, 1986

[54] TRAVELING RECLINING RESTRAINT AND COLLISION-PROTECTION DEVICE

[76] Inventors: Kenneth E. Fligsten; Ann M. Fligsten, both of 507 West Dr., Severna Park, Md. 21146

[21] Appl. No.: 799,241

[22] Filed: Nov. 18, 1985

[51] Int. Cl.⁴ .................. A47C 7/04; A47D 31/00
[52] U.S. Cl. ................................. 5/94; 5/424; 297/464
[58] Field of Search .............. 5/94, 98 B, 424, 118; 297/464, 465, 473

[56] References Cited

U.S. PATENT DOCUMENTS

| | | | |
|---|---|---|---|
| 198,927 | 1/1878 | Brooks | 5/94 |
| 1,616,591 | 2/1927 | McGee | |
| 2,348,217 | 5/1944 | Jones | 5/94 |
| 2,601,488 | 6/1952 | Allen | 5/94 |
| 3,159,850 | 12/1964 | Aldrich et al. | 5/94 |
| 3,203,011 | 8/1965 | Faludi | 5/94 |
| 3,454,968 | 7/1969 | Beckman | 5/94 |

FOREIGN PATENT DOCUMENTS 7904372 12/1980 Netherlands ..................... 5/118

Primary Examiner—Alexander Grosz
Attorney, Agent, or Firm—Schwartz, Jeffery, Schwaab, Mack, Blumenthal & Evans

[57] ABSTRACT

A method and apparatus for restraining a recumbent passenger in a moving vehicle. A flexible sheeting is secured at a first end portion to a vehicle seat back, a passenger is placed in the central portion of the sheeting, and the second end portion of the sheeting is secured to the first end to form a U-shaped cradle. Straps are provided for securing the passenger in the restraint device. A padded board can be positioned beneath the restraining straps to provide additional support for the passenger. The restraint device can also be attached to the vehicle seat cushion by engagement with a vehicle seat belt.

13 Claims, 4 Drawing Figures

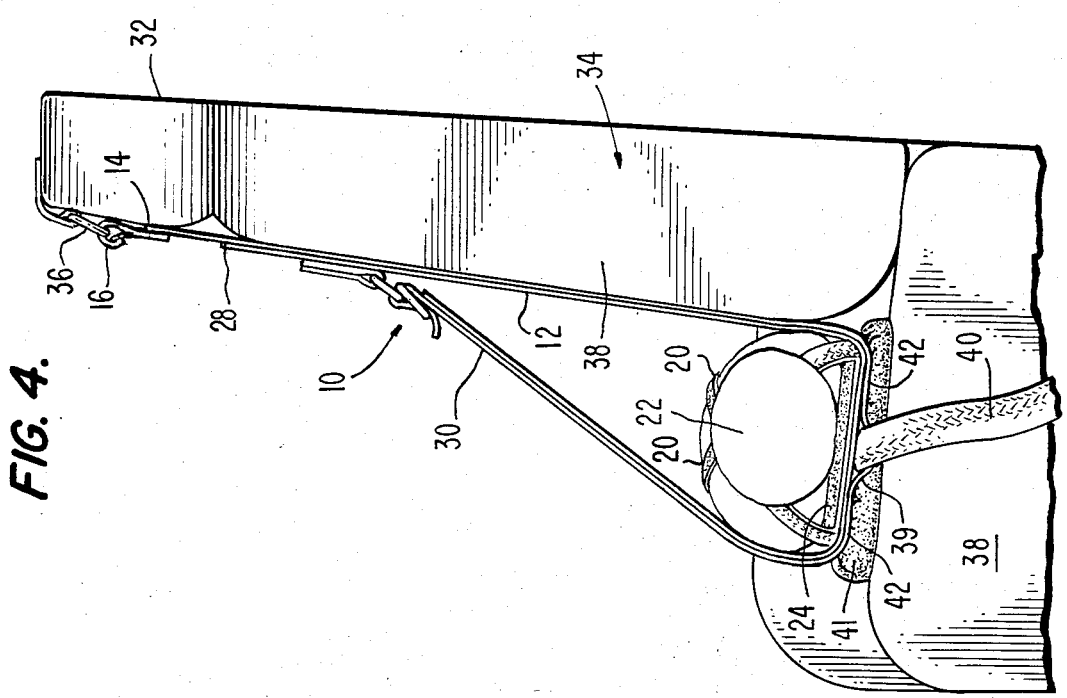
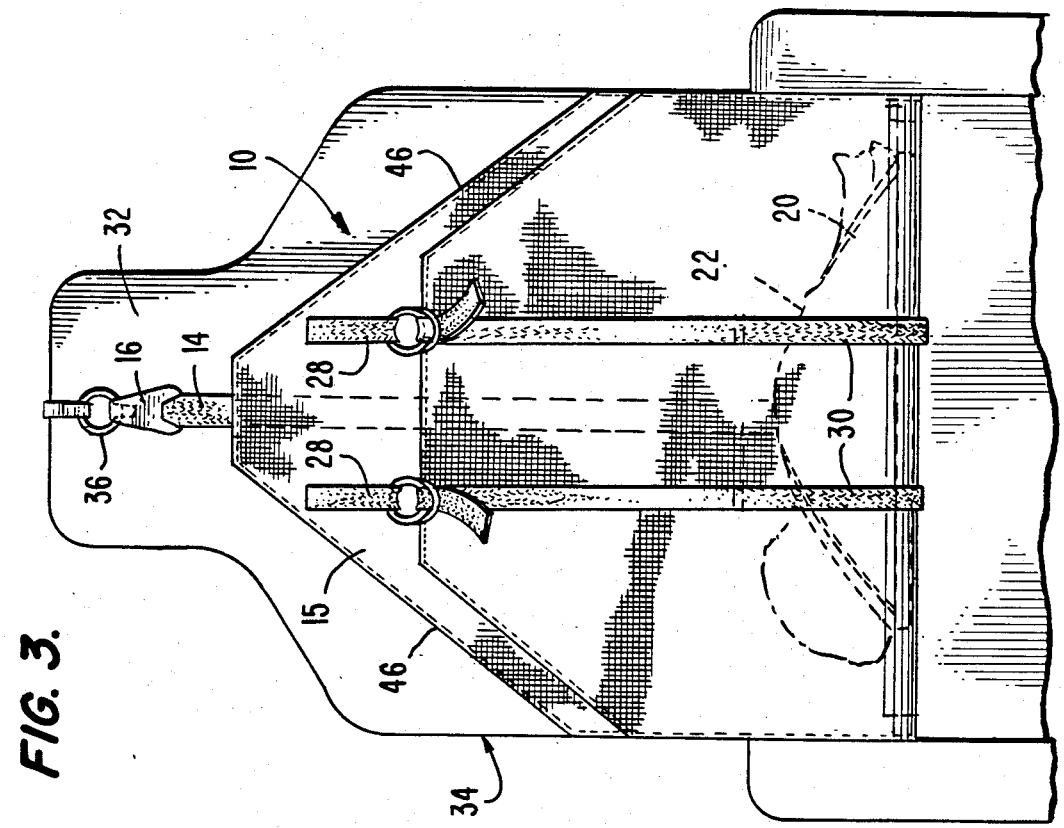

TRAVELING RECLINING RESTRAINT AND COLLISION-PROTECTION DEVICE

BACKGROUND OF THE INVENTION

1. Field of the Invention

The invention relates to a restraint device and more particularly to a restraint device primarily for use by a passenger in an automobile or other moving vehicles including emergency vehicles, e.g., ambulances or rescue helicopters, while the passenger is reclining or sleeping.

2. Prior Art

A number of devices have heretofore been used for passenger restraint in moving vehicles such as automobiles. A number of such devices are designed specifically for the transport of small children in automobiles, and consist of miniature chairs securable to an automobile seat. These devices perform adequately in their limited application, but are less suitable for adults, larger children or very small infants. Further, these devices are not designed to provide securement while the person is reclining or sleeping in a recumbent position. Further, chair-type restraints provide little or no protection from flying objects, such as shattered glass, which can be present during an autombile collision. They are also awkward to handle, are difficult to install and remove from autombiles, especially compact automobiles, and are generally non-collapsible, thereby posing storage problems.

Applicant's invention solves these problems through the use of a hammock-like restraint attachable to a vehicle seat, and which can be used for a passenger of any size, from small infant to adult. Hammocks in general have been used to confine infants, for various reasons, since before the advent of the automobile. U.S. Pat. No. 198,927 discloses a portable car seat attachment which is alleged to provide comfort to both child and adult traveller, especially during hot weather. More recently, hammocks have been used to carry parcels. U.S. Pat. No. 1,616,591 relates to a parcel hammock for an automobile, in which one end of the hammock is attaced to either side of the automobile. U.S. Pat. No. 3,203,011 teaches the use of a detachable playpen and bed for confining an infant during travel. Yieldable sides and front prevent the passenger from contacting any rigid surfaces. U.S. Pat. No. 3,454,968 discloses a baby "hammock", in which a cradle shell made, for example, of wicker or webbing, is suspended from the roof of the automboile by a system of ropes and pulleys. U.S. Pat. No. 3,159,850 relates to a safety cradle bed for a vehicle which includes a cradle portion and a supportng frame. The cradle bed assembly is placed on the seat cushion of an automobile. None of these devices are capable of adequately protecting a passenger during a collision, while at the same time minimizing complexity and storage problems and allowing the passenger to sleep or recline on a seat.

SUMMARY OF THE INVENTION

It is accordingly an object of the present invention to provide a method and apparatus for restraining a passenger in a moving vehicle.

It is another object of the invention to provide a method and apparatus, as above, which is designed to firmly secure passengers of all sizes, including very small or newborn infants, as well as adults.

It is still another object of the invention to provide a method and apparatus, as above, which secures a passenger who is sleeping or in a reclining position.

It is yet another object of the present invention to provide a method and apparatus, as above, in which the force generated through acceleration or deceleration of the vehicle is evenly distributed to minimize injury to the passenger.

It is yet another object of the invention to provide a method and apparatus, as above, which protects the passenger from flying objects during a collision.

It is still another object of the invention to provide an apparatus, as above, which can be folded and stored easily when not in use.

It is yet another object of the present invention to provide an apparatus, as above, which can be easily installed and removed from a vehicle.

It is still another object of the invention to provide an apparatus as above, which allows quick access to, and removal of, the passenger, as may be needed in emergency vehicles.

These objects and others are achieved by a restraint device for restraining a passenger in a moving vehicle, which comprises a flexible sheeting for cradling the passenger and having first and second end portions, means for securing at least the first end portion of the sheeting to a vehicles seat back, securement means for securing the passenger in a prone position at the central portion of the sheeting, and means for attaching the second end of the sheeting to the first end, forming thereby a U-shaped cradle, the central portion of the sheeting forming the curvate portion of the cradle.

The objects of the invention are also achieved by a method for restraining a passenger in a moving vehicle comprising laying a flexible sheeting on a vehicle seat, the sheeting having a central portion and two end portions, attaching a first end portion to the vehicle seat back, positioning a passenger on the central portion of the sheeting, securing the passenger in the central portion, and attaching the second end portion to the first end portion, forming thereby a U-shaped cradle, the central portion of the sheeting forming the curvate portion of the cradle. The sheeting is also secured to the seat bottom.

BRIEF DESCRIPTION OF THE DRAWINGS

The above and other objects of the invention will become more apparent from the following description and accompanying drawings, wherein:

FIG. 3 is a front view of the securement device as it appears secured to a car seat in the folded position; and FIG. 4 is a side view of the folded restriant device shown in FIG. 3.

DETAILED DESCRIPTION OF THE PREFERRED EMBODIMENTS

The invention can be employed in nearly any type of moving vehicle, such a automboiles, trains, helicopters, airplanes, boats and the like.

Figure 1:
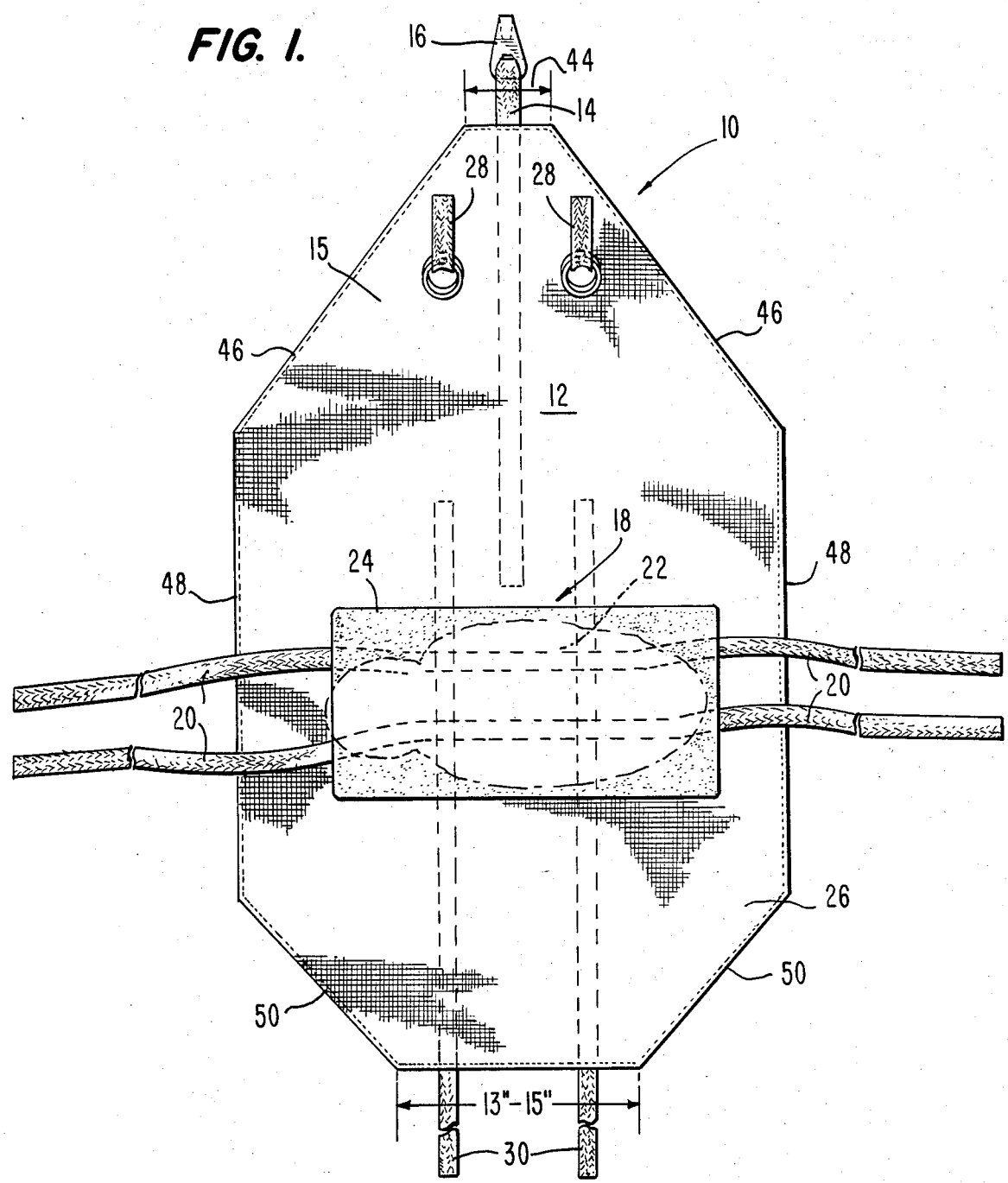
FIG. 1 is a front view of the restraint device of the invention in its opened, unsecured position.

A restraint device according to the invention is illustrated in FIG. 1 and is designated generally by the number 10. The restraint device includes a cloth or mesh sheeting material 12 which, in the preferred embodiment shown in the figure, is of a truncated rectangular shape. The device has attached at a first end a means for securement to a vehicle seat, such as, for example, a strap 14 having a buckle 16.

Figure 2:
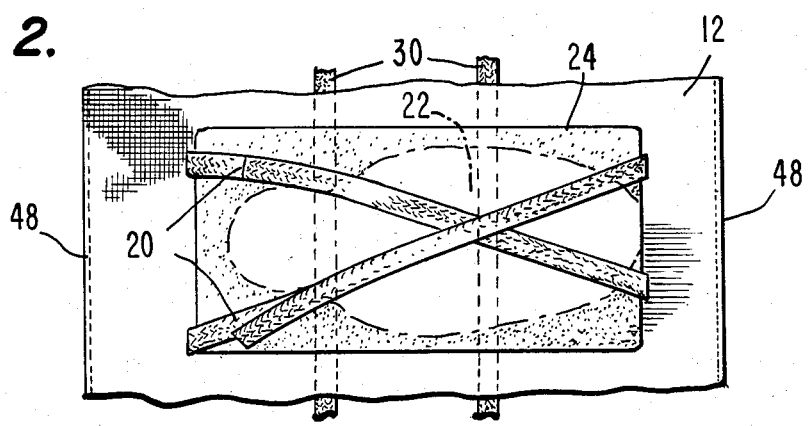
FIG. 2 is a view of the central portion of the restraint device, illustrating the securement means.

Means are provided at the central portion 18 of the restraint device for restraining a passenger. Suitable for this purpose are a pair of straps 20 attached to the sheeting which, as illustrated most clearly in FIG. 2, can be used in a criss-crossed or "X" pattern to secure a passenger such as an infant 22 in a prone position. The retaining straps 20 are used to secure the passenger primarily from lateral, that is, side-to-side motion. Beneath the retaining straps 20 may optionally be positioned a padded board 24 (FIG. 1), which aids in supporting comfortably the passenger.

Once the passenger has been placed in the central portion 18, the second end 26 is folded around the passenger and attached to the first end 15 by suitable means, such as double ring strap retainers 28 which secure straps 30 extending from the second end 26. Straps 30 preferably extend along a portion of the outer surface of the restraining device, as illustrated in FIG. 3, and in phantom in FIG. 1.

As shown specifically in FIGS. 3 and 4, the restraint device can be attached to the vertical back 32 of a vehicle seat 34 by attachment means such as a ring 36 attached at the top end of the vehicle seat back 32, which engages buckle 16.

Means may also be provided for attachment of the restraint device to the vehicle seat cushion 38 such as loops 39, or other suitable fastening means which can engage each end of a vehicle seat belt 40. The loops 39 are preferably formed by portions of straps 30 left unsecured to the sheeting at the central portion 18. Padding 41 may also be provided between the curvate portion 42 of the sheeting and the cushion 38. The padding preferably provides frictional engagement between the restraint device and the cushion 38, which, in the case of rapid deceleration, helps the restraint device to maintain contact with the cushion.

Passengers of various sizes can be secured in the device by providing that the sheeting material is of sufficient width and length. The invention is useful not only in securing passengers for every day travel, but also in cases where the passenger is unconscious or injured.

The following additional advantages are also realized by the invention.

Besides being capable of securely restraining a newborn or very young infant, the instant invention provides the following additional advantages.

First, by means of the U-shaped cradle formed by securement of the second end 26 to the first end 15 as shown in FIGS. 3 and 4, the passenger is substantially protected from flying objects such as shattered glass, which can be present during collision or crash of the vehicle. Second, during rapid vehicle deceleration, the forward momentum of the passenger is constrained, not only by retainment straps 20, but also by the entire sheeting material surrounding the passenger. That is, if during a collision the pasenger is thrown forward, the force generated by the forward momentum is spread evenly over the relatively large portion of the passenger's body surface which comes in contact with the sheeting, rather than being concentrated at only the restricted pressure points formed by the straps 20. Similarly, in rapid acceleration, such as can occur if the vehicle is struck from behind, the passenger is forced against the seat back 32, and is similarly prevented from experiencing injury due to the retaining straps and the force absorbed by the seat padding.

A further advantage of the invention is that the restraint device occupies a minimum of space when in use. There are no bulky handles, metal tubing or the like commonly used in chair-type devices. The restraint device of the invention can be folded neatly within a compact space when not in use, due to its flexible nature and simple construction. The passenger can also easily be inserted into, and removed from, the restraint device, as only a minimum number of fastening devices are necessary for proper securement. As a further aid in this regard, the retaining straps 20 can utilize Velcro ®, i.e., hook and loop fasteners, for rapid attachment and detachment. It is also a simple matter to remove the entire restraint device, with the passenger secured therein, from the vehicle seat merely by disengaging the buckle 16 or other fastening means securing the restraint device to the vehicle seat back 32. The restraint device can also double as a simple hammock for cradling the passenger after removal from the vehicle.

The actual dimensions of the restraint device can vary depending on the size of the passenger and/or the size of the seat to which it is to be attached. In the preferred embodiment shown in FIG. 1, the first end 15 has a horizontal width 44 of between 4 and 5 inches. Diagonal sides 46 have a length of between 21 and 24 inches, while vertical sides 48 have a length of from 24 to 28 inches. Diagonal sides 50 extending to second end 26 preferably have a length of from 12 to 14 inches, while the horizontal side of second end 26 has a length of from 13 to 15 inches.

The foregoing description of preferred embodiments has been set forth merely to illustrate the invention and is not intended to be limiting. Since modifications of the described embodiments incorporating the spirit and substance of the invention may occur to persons skilled in the art, the scope of the invention should be limited solely with respect to the appended claims and equivalents.

What is claimed is:

1. A restraint device for restraining a passenger in a moving vehicle, comprising:
   a flexible sheeting for cradling the passenger and having first and second end portions and a central portion;
   means for securing at least the first end portion of said sheeting to a vehicle seat back;
   securement means for securing the passenger in a prone position at the central portion of said sheeting; and
   means for attaching the second end of said sheeting to said first end, forming thereby a U-shaped cradle, said central portion of said sheeting forming the curvate portion of said cradle.

2. A restraint device as claimed in claim 1, wherein said securement means comprises a pair of straps.

3. A restraint device as claimed in claim 2, wherein said straps form an X-shaped pattern over the passenger.

4. A restraint device as claimed in claim 1, wherein said means for securing at least said first end portion of said sheeting includes a buckle attached to said first end and a ring attached to the vehicle seat back, said buckle releasably engaging said ring.

5. A restraint device as claimed in claim 1, wherein said means for attaching the second end portion of said sheeting includes a strap attached at each side of said sheeting at said second end, and a double ring strap retainer positioned at each side of said first end portion, each of said straps releasably secured by a separate strap retainer ring.

6. A restraint device as claimed in claim 1, wherein said restraint device further includes a board positioned beneath the securement means.

7. A restraint device as claimed in claim 1, wherein the restraint device further includes means for securement to a vehicle seat cushion.

8. A restraint device as claimed in claim 7, wherein said cushion securement means includes a plurality of loops engageable with a vehicle seat belt.

9. A restraint device as claimed in claim 1, wherein padding is inserted between the device and the vehicle seat cushion.

10. A method for restraining a passenger in a moving vehicle, comprising:

laying a flexible sheeting on a vehicle seat, said sheeting having a central portion and two end portions;
    attaching a first end portion to the vehicle seat back;
    positioning a passenger on the central portion of the sheeting;
    securing the passenger in the central portion; and
    attaching the second end portion to the first end portion, forming thereby a U-shaped cradle, the central portion of the sheeting forming the curvate portion of the cradle.

11. A method as claimed in claim 10, wherein said method includes securing the central portion to the vehicle seat cushion.

12. A method as claimed in claim 11, wherein said central portion is secured to the vehicle seat cushion by means of a plurality of loops engageable with a vehicle seat belt.

13. A method as claimed in claim 10, wherein said method includes placing padding between the central portion of the sheeting and the vehicle seat cushion.

* * * * *